US008670176B2

United States Patent
Naito et al.

(10) Patent No.: US 8,670,176 B2
(45) Date of Patent: Mar. 11, 2014

(54) OPTICAL AMPLIFYING DEVICE

(75) Inventors: Mayumi Naito, Kawasaki (JP); Yuichi Suzuki, Kawasaki (JP); Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 12/612,775

(22) Filed: Nov. 5, 2009

(65) Prior Publication Data
US 2010/0123949 A1    May 20, 2010

(30) Foreign Application Priority Data

Nov. 18, 2008  (JP) .................................. 2008-294955

(51) Int. Cl.
*H01S 3/00* (2006.01)
(52) U.S. Cl.
USPC ..................................... 359/337.4; 359/337.5
(58) Field of Classification Search
USPC ........................................... 359/337.5, 337.4
See application file for complete search history.

(56) References Cited

U.S. PATENT DOCUMENTS

| | | | |
|---|---|---|---|
| 5,717,510 A | 2/1998 | Ishikawa et al. | |
| 5,963,361 A * | 10/1999 | Taylor et al. | 359/337 |
| 5,995,274 A * | 11/1999 | Sugaya et al. | 359/337 |
| 6,055,092 A | 4/2000 | Sugaya et al. | |
| 7,359,112 B2 | 4/2008 | Nishihara et al. | |
| 7,880,960 B2 * | 2/2011 | Komaki et al. | 359/337.1 |
| 2007/0047067 A1 | 3/2007 | Onaka et al. | |
| 2010/0284689 A1 | 11/2010 | Yuki et al. | |

FOREIGN PATENT DOCUMENTS

| | | |
|---|---|---|
| JP | 8-248455 | 9/1996 |
| JP | 8-321805 | 12/1996 |
| JP | 2004-179799 | 6/2004 |
| JP | 2006-295113 | 10/2006 |
| JP | 2007-67235 | 3/2007 |
| JP | 2008-252233 | 10/2008 |

OTHER PUBLICATIONS

M. Nakazawa, et al., "Recent Progress and Future Prospects for High-Speed Optical Transmission Technology Using an Ultrashort Optical Pulse Train", IEICE Trans., vol. J89-B, No. 11, pp. 2067-2081, Nov. 1, 2006.
Japanese Office Action issued Oct. 30, 2012 in corresponding Japanese Patent Application No. 2008-294955.

* cited by examiner

*Primary Examiner* — Mark Hellner
(74) *Attorney, Agent, or Firm* — Staas & Halsey LLP

(57) ABSTRACT

An optical amplifying device includes a first optical amplifier for amplifying signal light; a second optical amplifier serially connected with the first optical amplifier; an optical device for compensating deterioration of the signal light, the optical device arranged between the first optical amplifier and the second optical amplifier; a variable optical attenuator for attenuating the signal light, the variable optical attenuator arranged between the first optical amplifier and the second optical amplifier; a first automatic level controller for detecting a second amplifier output power and for controlling driving status of the second amplifier in a predetermined output power level; and a first automatic gain controller for detecting an input power of the second optical amplifier and an output power of the second optical amplifier, and for controlling an optical attenuation value of the variable optical attenuator.

14 Claims, 12 Drawing Sheets

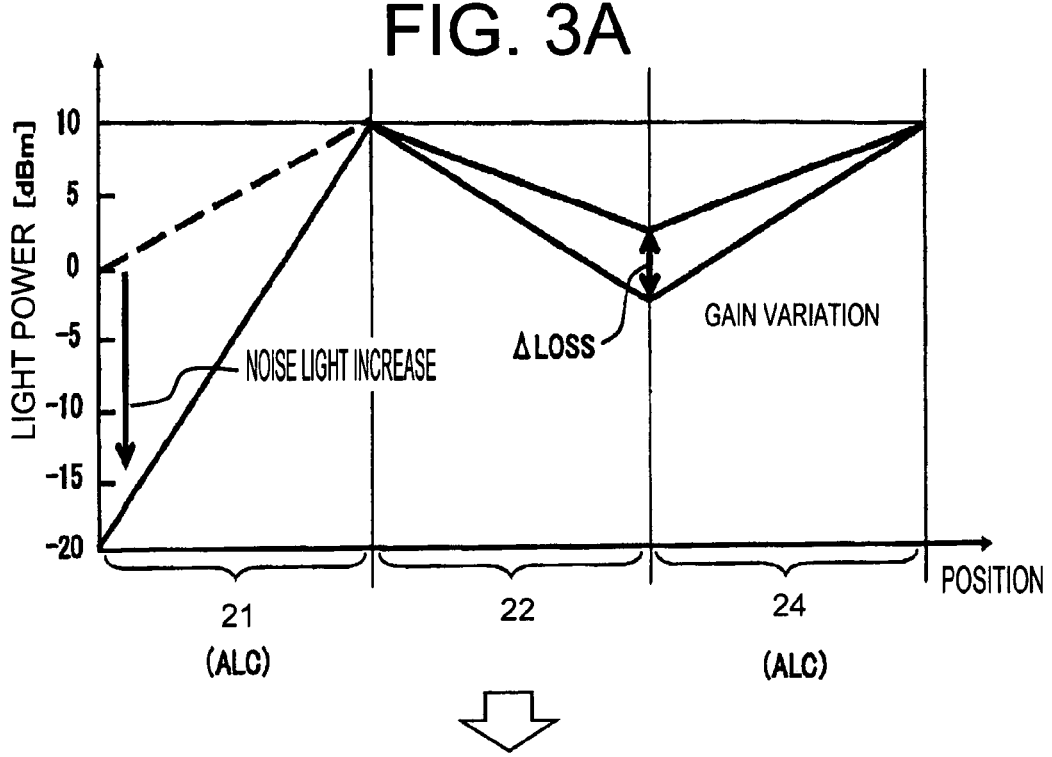
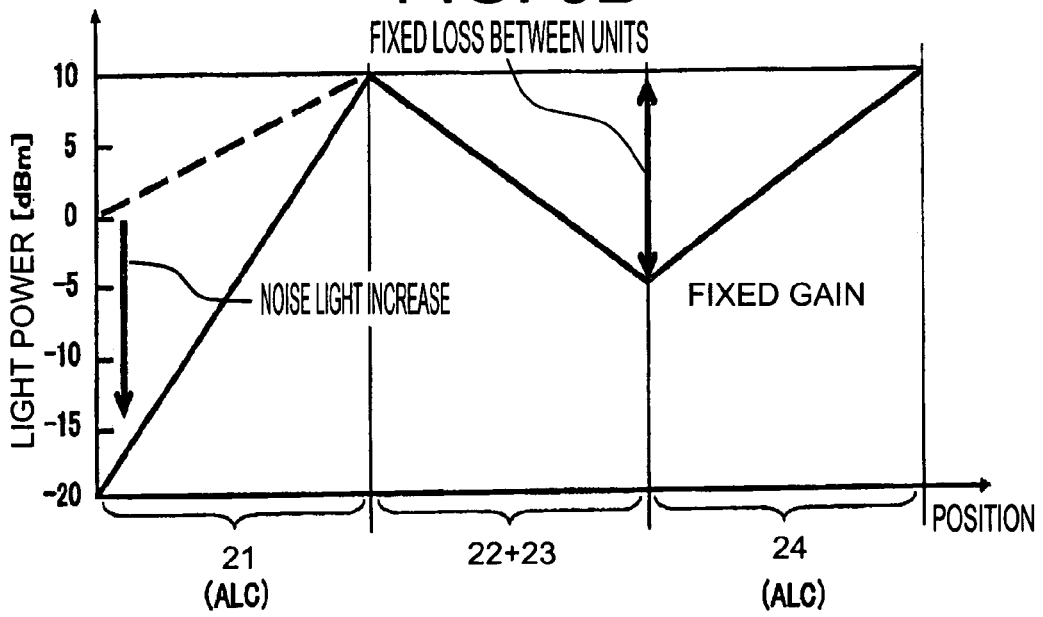

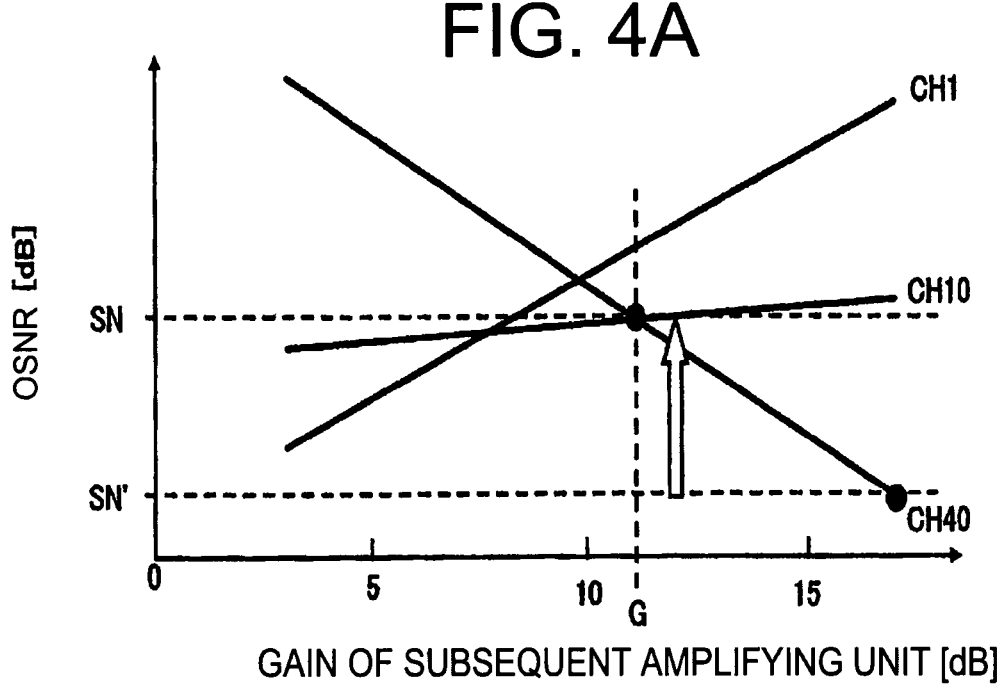
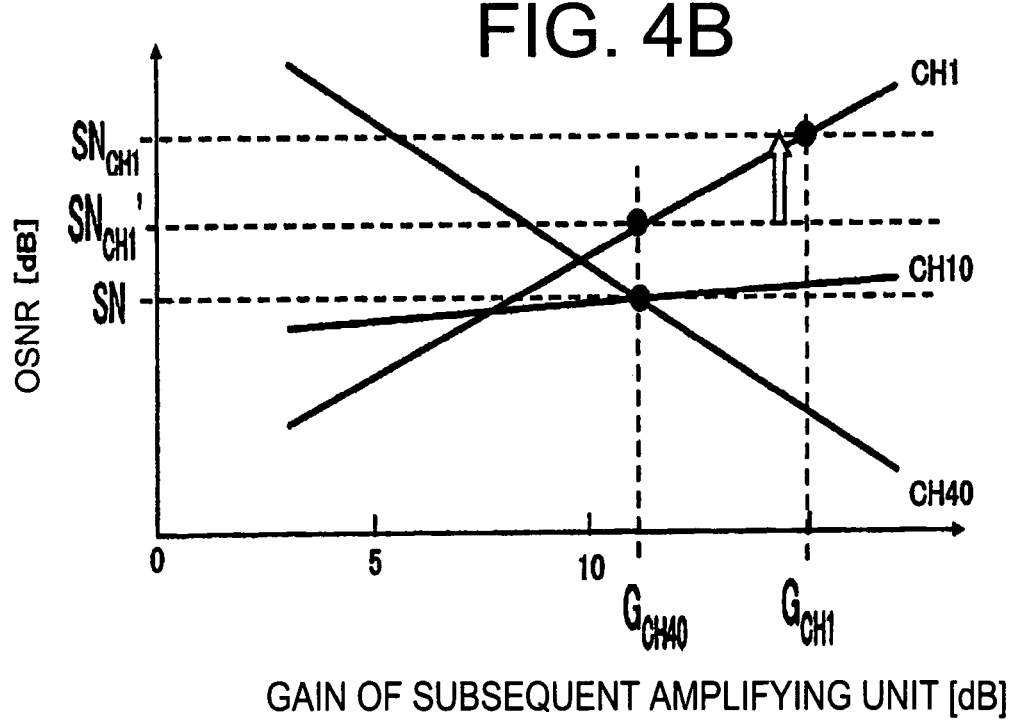

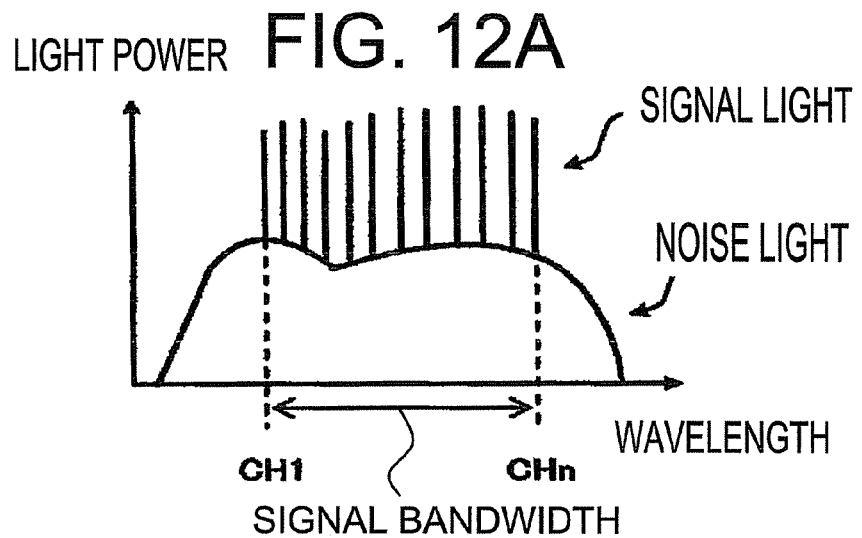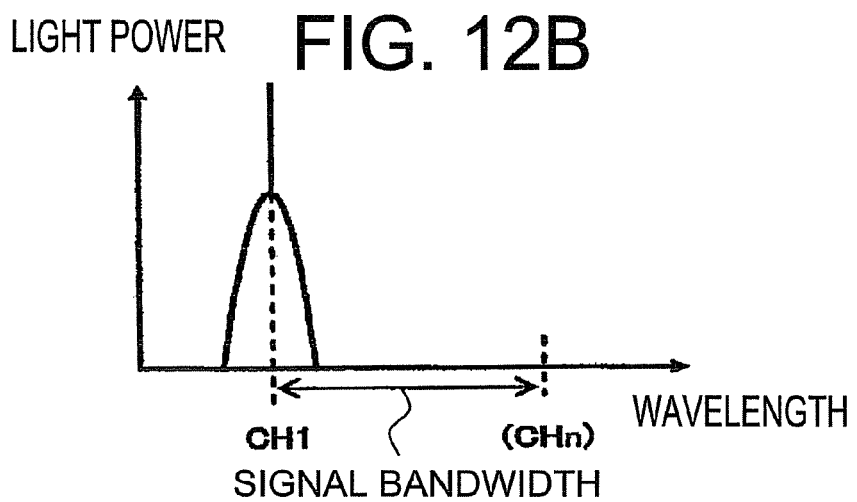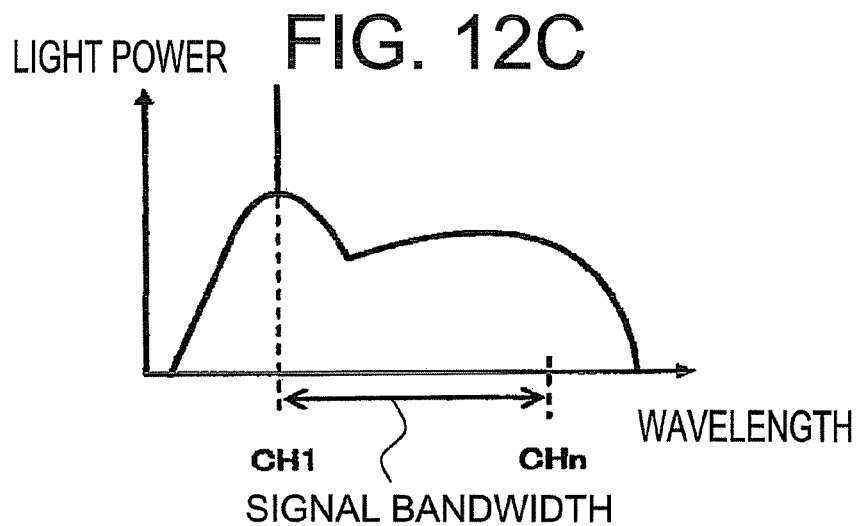

OPTICAL AMPLIFYING DEVICE

CROSS-REFERENCE TO RELATED APPLICATION

This application is based upon and claims the benefit of priority of the prior Japanese Patent Application No. 2008-294955, filed on Nov. 18, 2008, the entire contents of which are incorporated herein by reference.

FIELD

The embodiments discussed herein are related to an optical amplifier.

BACKGROUND

In an optical communication system, if a transmission speed reaches as high a speed as 40 Gb/s or more, a light pulse width of a transmission signal becomes as narrow as several picoseconds. Thus, waveform distortion accompanying slight wavelength dispersion (Chromatic Dispersion) or polarization-mode dispersion (Polarization-Mode Dispersion) of an optical fiber considerably deteriorates transmission characteristics. In addition, as is well known, a dispersion value of a transmission fiber varies with time along with a change in temperature or environment. This slight change influences transmission characteristics (for example, see NAKAZAWA Masataka and HIROOKA Toshihiko, "Recent Progress and Future Prospects for High-Speed Optical Transmission Technology Using an Ultrashort Optical Pulse Train", IEICE Trans., Vol. J89-B, No. 11, pp. 2067-2081).

FIG. 11 illustrates a light receiving unit of a wavelength division multiplexing (Wavelength Division Multiplexing: WDM) transmission system using a chromatic dispersion compensation or polarization-mode dispersion compensation technique. In FIG. 11, a light receiving unit 100 divides WDM light subjected to simultaneous amplification in an optical preamplifier 101 on a wavelength basis by use of a separator 102. Light signals CH1, CH2, . . . , CHn of different wavelengths output from the separator 102 are supplied and input to receiving modules 103_1, 103_2, . . . , 103_n. On optical paths of the receiving modules 103_1, 103_2, . . . , 103_n, functional components 111 such as a tunable dispersion compensator (Tunable Dispersion Compensator: TDC) and a polarization-mode dispersion compensator (Polarization-Mode Dispersion Compensator: PMDC) are provided. The individual functional components 111 perform appropriate dispersion compensation on received light.

In the case of adopting the functional components 111 such as the TDC and the PMDC as above, if a power level of received light reduces due to a light loss in each functional component 111, a bit error rate (Bit Error Rate: BER) increases in a receiver 112 and a regenerator 113. To suppress the increase in BER, the receiving modules 103_1, 103_2, . . . , 103_n corresponding to each wavelength need to add an optical amplifier 114 at its previous stage together with the aforementioned functional components 111 and let the amplifier to function to compensate for the light loss of the functional components 111. However, the adoption of the optical amplifier 114 might cause the following problem: a waveform of received light is deteriorated due to noise light such as amplified spontaneous emission (Amplified Spontaneous Emission: ASM) generated at the time of amplifying a light signal with the optical amplifier 114.

Here, a difference between a WDM optical amplifier for simultaneously amplifying multiple wavelengths and a single-waveform optical amplifier is described. In the WDM transmission system, many WDM optical amplifiers for simultaneously amplifying multiple wavelengths (for example, the optical amplifier 101 in FIG. 11) are provided on an optical path through which WDM light propagates, in addition to a single-waveform optical amplifier disposed at a previous stage to the receiver corresponding to each wavelength as above. As illustrated in FIGS. 12A to 12C, noise light such as ASE generated in the WDM optical amplifiers (see in the FIG. 12A) passes through the separator 102 of the light receiving unit 100. Thus, only noise components in a band of each light signal transmit the separator 102 and sent to the receiver 112 corresponding to each signal wavelength, while noise components outside the band is blocked by the separator 102 (see in the FIG. 12B). Thus, noise light generated in the WDM optical amplifier has less effect on reception characteristics of light signals of different characteristics, and the effect is often negligible.

On the other hand, the single-wavelength optical amplifier 114 is provided on each optical path for propagating a light signal of a corresponding wavelength divided by the separator 102. Therefore, noise light generated in the optical amplifier 114 at a wide wavelength band directly enters the receiver 112 (see in the FIG. 12C). This reduces a rate of power of a light signal of single wavelength to the total power of noise light, which causes an increase in BER.

One of the known conventional techniques for suppressing deterioration of reception characteristics due to noise light generated in a single-wavelength optical amplifier provides, for example, an optical filter 115 on an optical path between the optical amplifier 114 and the receiver 112 as illustrated in FIG. 13 to filter out light outside a band of a received light signal by use of the optical filer 115 (for example, see Japanese Laid-open Patent Publication No. 8-321805 and Japanese Laid-open Patent Publication No. 2004-179799).

Further, another problem of a light receiving device applied to the above WDM transmission system is a transmission error caused by rapid change in power level of received light. To elaborate, if a transmission speed reaches 40 Gb/s or more, a light pulse width of a transmission signal becomes as narrow as several picoseconds (ps). A receiver designed for such high-speed light signals is originally insufficient in transmission margin (margin) and in addition, is more likely to cause a transmission error if such situations that a detection point for a reception level cannot be followed well and a reception power exceeds an allowable level occur at the same time.

The rapid change in power level of a received light would easily occur due to the following factors: a connector is inserted or removed due to human error and an optical fiber is exposed to any external stimulus (for example, a stress accompanying a touch on the optical fiber or a change in wired environment). In addition, as is also known, in the case where the number of wavelengths of WDM light rapidly changes as well as in the case where a power of a received light changes, a phenomenon that a power level of a residual light signal changes occurs, which causes a transmission error (for example, see Japanese Laid-open Patent Publication No. 2006-295113). It is also considered that the rapid change in the number of wavelengths easily occurs due to dynamic re-setup of an optical transmission path, insertion/removal of a connector caused by human error, and disconnection of an optical fiber.

In order to suppress occurrences of transmission errors accompanying such a rapid change in power level of received light, it is effective to apply high-speed automatic level control (Automatic Level Control: ALC) to an optical amplifier(s) in the light receiving device, for example. The ALC is generally performed such that an output light power of an optical amplifier is monitored by a photodetector, and feedback control is executed on a drive state of the optical amplifier (for example, an output power of an excitation light source) until the monitor value reaches a target output light power (for example, see Japanese Laid-open Patent Publication No. 8-248455).

Incidentally, the single-waveform optical amplifier disposed at a previous stage to each receiver for a corresponding wavelength of the WDM light should be prepared in a number corresponding to the number of wavelengths of WDM light. The configuration or control method of the individual optical amplifiers is desirably designed to be common to all wavelengths in a wide wavelengths of WDM light, not varying depending on a wavelength of an input light signal from the viewpoint of cost saving. In connection with the purpose for meeting such a demand, a light loss varies among the aforementioned functional components such as the TDC and the PMDC. In addition, under actual conditions, it is inevitable that performance varies among receivers ready for high-speed light signals that propagate at as high a speed as 40 Gb/s or more. Therefore, how to uniformly design optical amplifiers to enable compensation for these variations is important. However, only the use of the above conventional techniques in combination causes the following problems and can hardly meet the above demand.

In the case of inserting an optical filter for filtering out light outside a band of received light to an optical path between an optical amplifier and a receiver to suppress deterioration of reception characteristics due to noise light generated in the single-wavelength optical amplifier, a rate of power of a light signal of single wavelength to the total power of noise light increases, with the result that an effect of improving the reception characteristics is large. However, an insertion loss of the optical filter and variations thereof are added, which further complicates the design of the single-wavelength optical amplifier. Similar to the single-wavelength optical amplifier, the optical filter should be prepared in a number corresponding to the number of wavelengths of WDM light. A general-purpose variable optical filter costs high and influences a cost of the entire system. Even though the effect of improving reception characteristics is large, there is a real problem that the optical filter would not be applied easily.

In the case of applying high-speed automatic level control (ALC) to the single-wavelength optical amplifier to suppress occurrences of transmission errors due to rapid change in power level of received light, the ALC needs to compensate for not only a dynamic change in power of received light but a difference in power of received light due to static factors from the inside/outside of a receiving module. The compensation brings about a large change in gain of the optical amplifier. The static factors from the outside of the receiving module include a change in output level of an optical preamplifier for simultaneously amplifying WDM light at a previous stage to a separator and variations in insertion loss of the separator. On the other hand, the static factors from the inside of the receiving module include variations in target value of a level of optical input to each receiver (corresponding to a target control level of ALC in the single-wavelength optical amplifier), which accompany variations in light loss between the functional components such as the TDC or the PMDC or variations in performance between the receivers.

It is known that an amount of generated noise light and wavelength characteristics thereof largely change if a gain of the optical amplifier changes. This also means that if a gain varies among plural single-wavelength optical amplifiers disposed in a number corresponding to the number of wavelengths of WDM light, the optical amplifiers differ in generation status of noise light. FIG. 14 illustrates gain spectra of an Erbium-doped fiber amplifier (Erbium-Doped Fiber Amplifier: EDFA) in accordance with an inverted distribution ratio of Erbium ions, for example. As can be understood from FIG. 14, in this EDFA, an amount of generated noise light is relatively large on a short-wavelength side in a high-gain (high inverted distribution ratio) status while an amount of generated noise light is relatively large on a long-wavelength side in a low-gain (low inverted distribution ratio) status.

If a light loss of the functional components such as the TDC or the PMDC is large or a target value of a level of optical input to the receiver is set high, a high gain is required of the single-wavelength optical amplifier. In the above example of the EDFA, an amount of generated noise light becomes relatively large on a short-wavelength side. If a light signal of a short wavelength is amplified with the optical amplifier in this status, a rate of power of signal light to the total power of noise light in output light of the optical amplifier (input light in the receiver) is reduced. On the other hand, if a light loss of the functional components is small or a target value of a level of optical input to the receiver is set low, a gain required of the single-wavelength optical amplifier is low. In the above example of the EDFA, an amount of generated noise light becomes relatively large on a long-wavelength side. If a light signal of a long wavelength is amplified with the optical amplifier in this status, a rate of power of signal light to the total power of noise light in output light of the optical amplifier is reduced.

In other words, a rapid change in power level of received light can be compensated for by applying high-speed ALC to the optical amplifier. As for how a gain change resulting from the ALC influences a reception characteristic of a light signal of a corresponding wavelength in WDM light, it is necessary to comprehensively consider a difference in generation status of noise light between the wavelengths, which is caused by variations in light loss among the functional components such as the TDC or the PMDC and variations in performance among the receivers. Realistically, this brings about a problem of hindering uniform design for the single-wavelength optical amplifier.

SUMMARY

According to an aspect of the invention, an optical amplifying device includes a first optical amplifier for amplifying signal light inputted from in an optical transmission line; a second optical amplifier serially connected with the first optical amplifier; an optical device for compensating deterioration of the signal light, the optical device arranged between the first optical amplifier and the second optical amplifier; a variable optical attenuator for attenuating the signal light, the variable optical attenuator arranged between the first optical amplifier and the second optical amplifier; a first automatic level controller for detecting a second amplifier output power and for controlling driving status of the second amplifier in a predetermined output power level; and a first automatic gain controller for detecting an input power of the second optical amplifier and an output power of the second optical amplifier, and for controlling an optical attenuation value of the variable optical attenuator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are level diagrams of a light signal in the light receiving module of the first embodiment;

FIGS. 4A and 4B illustrate a relationship between an optical SN ratio and a gain of a subsequent optical amplifying unit;

FIGS. 12A to 12C illustrate noise light in input light to a receiver;

DESCRIPTION OF EMBODIMENTS

Figure 1:
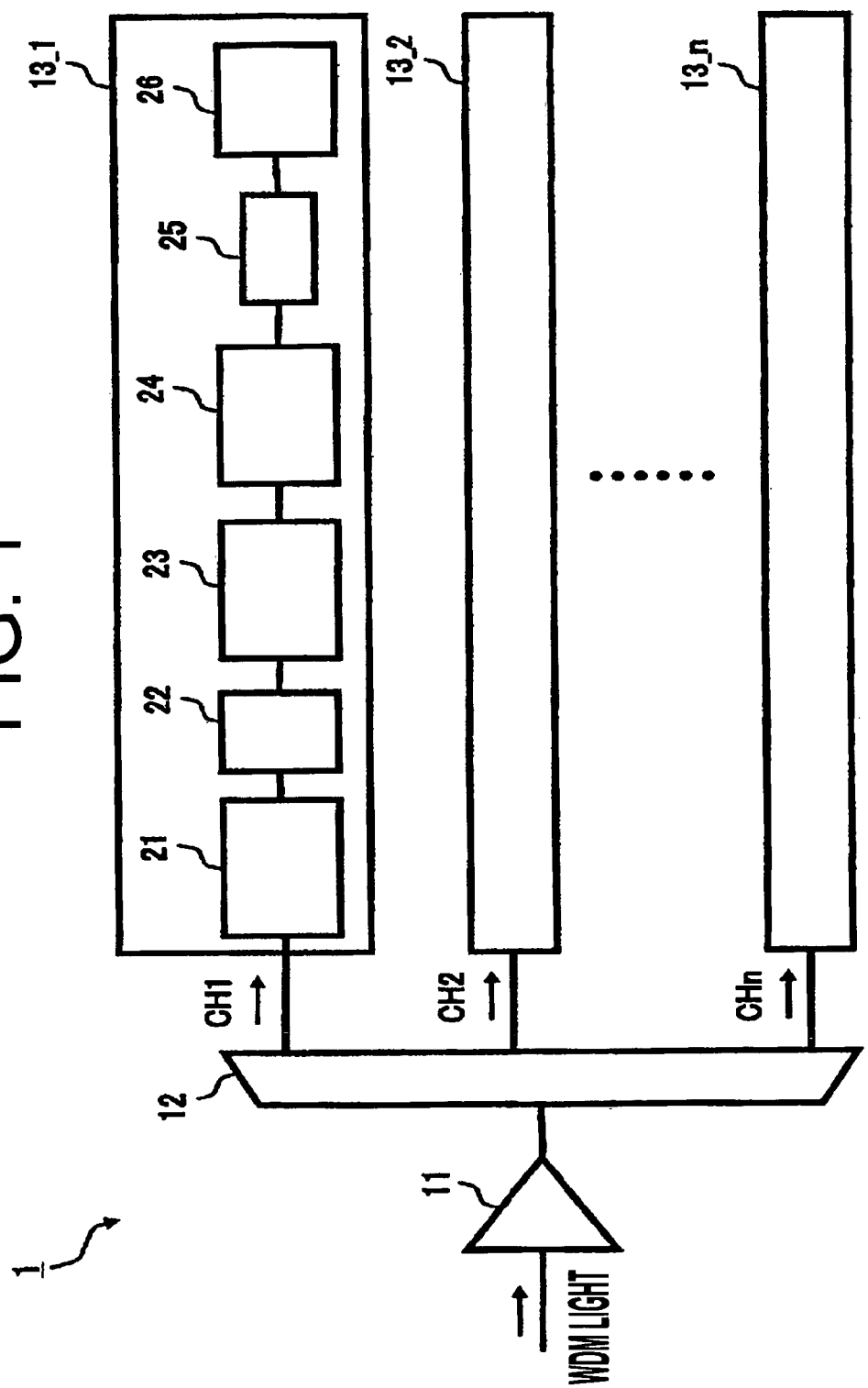
FIG. 1 is a block diagram of the main configuration of a light receiving device in a WDM transmission system using a light receiving module according to a first embodiment.

Embodiments of the present invention will be illustrated below with reference to the accompanying drawings. Here, identical reference numerals denote identical or equivalent components throughout the drawings.

FIG. 1 is a block diagram of the main configuration of a light receiving device in a WDM transmission system using a light receiving module according to a first embodiment of the present invention.

In FIG. 1, a light receiving unit 1 includes, for example, an optical preamplifier 11, a separator 12, and light receiving modules 13_1 to 13_n of the first embodiment. The optical preamplifier 11 is connected to an optical transmission path of the WDM transmission system including the light receiving unit 1 and receives WDM light transmitted through the optical transmission path. The WDM light includes plural light signals (channels) CH1, CH2, . . . , CHn having different wavelengths. The channels CH1, CH2, . . . , CHn are simultaneously amplified up to a desired level by the optical preamplifier 11. The configuration of the optical preamplifier 11 is the same as that of the known WDM optical amplifier. In this example, it is assumed that the number of wavelengths (channels) of WDM light input to the light receiving unit 1 is n.

The separator 12 receives, at an input port, the WDM light subjected to the simultaneous amplification in the optical preamplifier 11 and then divides the WDM light on a wavelength basis. The divided channels CH1, CH2, . . . , CHn are output from a corresponding output port of the separator 12. The output ports of the separator 12 are connected to the light receiving modules 13_1 to 13_n. Each of the output ports of the separator 12 is single wavelength light.

Each of the light receiving modules 13_1 to 13_n includes, for example, serially-cascaded previous optical amplifying unit 21 and subsequent optical amplifying unit 24, and a functional component 22 and a variable optical attenuating unit 23 arranged in this order between the two-staged optical amplifying units 21 and 24, a receiver 25 connected to an output side of the subsequent optical amplifying unit 24, and a regenerator 26 connected to an output side of the receiver. Although only the configuration of the light receiving module 13_1 corresponding to the channel CH1 is illustrated in FIG. 1, the configuration of the light receiving modules 13_2 to 13_n corresponding to the other channels CH2 to CHn is the same as that of the light receiving module 13_1. In the following description, the configuration and operation corresponding to the channel CH1 are discussed in detail as a representative of the light receiving modules 13_1 to 13_n, and the configuration and operation corresponding to the other channels CH2 to CHn are not mentioned.

Figure 2:
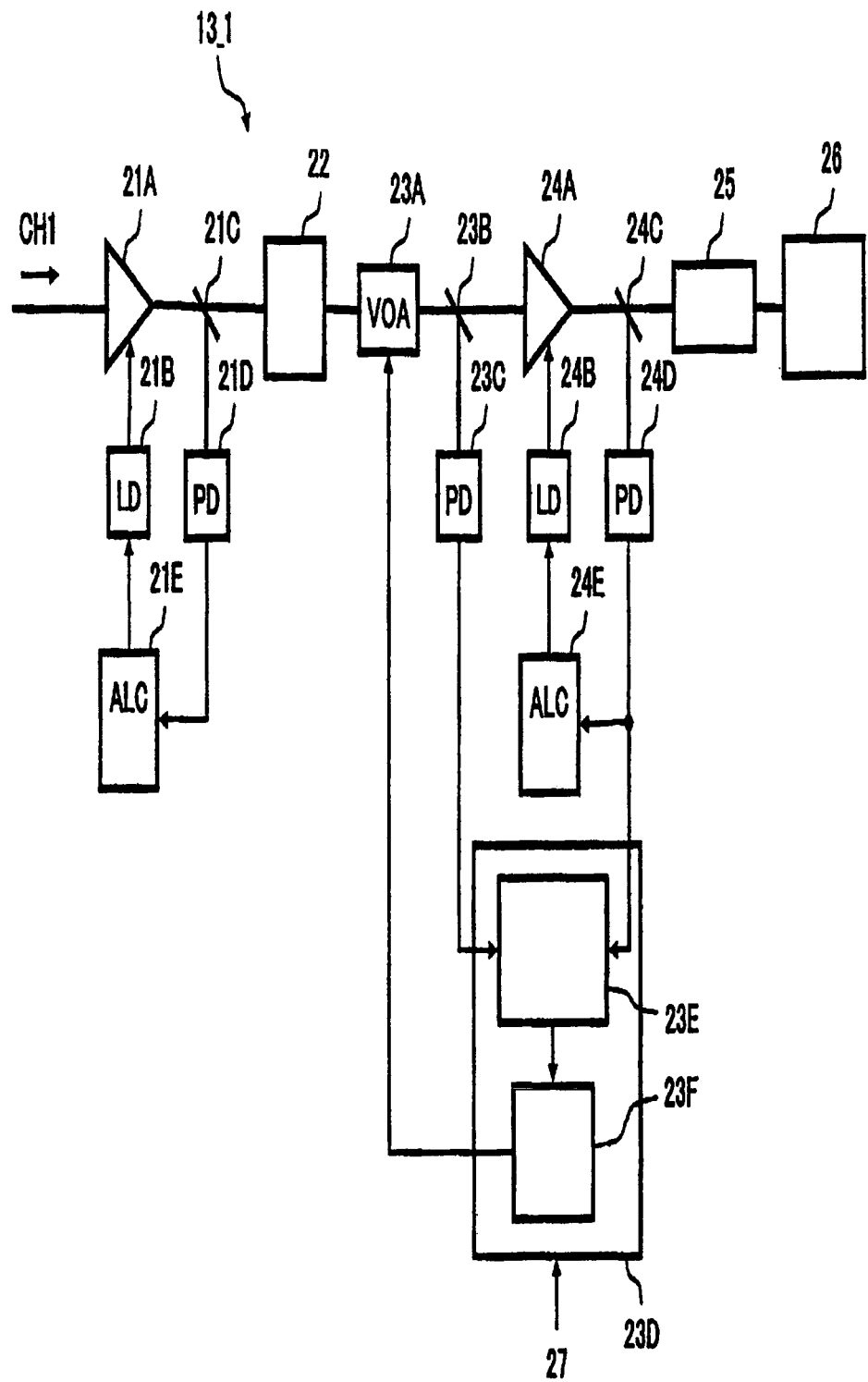
FIG. 2 is a block diagram of the detailed configuration of the light receiving module of the first embodiment.

FIG. 2 is a block diagram of the detailed configuration of the light receiving module 13_1.

In the configuration example in FIG. 2, the previous optical amplifying unit 21 includes an amplifying medium 21A, an excitation light source (LD) 21B, a beam splitter 21C, a photodetector (PD) 21D, and an ALC circuit 21E. Likewise, the subsequent optical amplifying unit 24 includes an amplifying medium 24A, an excitation light source (LD) 24B, a beam splitter 24C, a photodetector (PD) 24D, and an ALC circuit 24E.

As for the amplifying media 21A and 24A, a rare-earth-doped fiber obtained by doping rare earth such as Erbium to a core of an optical fiber is used. The excitation light sources 21B and 24B generate excitation light for exciting the amplifying media 21A and 24A. In this example, a rare-earth-doped fiber amplifier using the rare-earth-doped fiber as an amplifying medium is applied to the previous and subsequent amplifying units 21 and 24 for illustrative purposes. The present invention is not limited thereto. For example, any known optical amplifier such as a lumped Raman amplifier or a semiconductor optical amplifier using a highly nonlinear fiber as an amplifying medium can be applied to the optical amplifying unit in each stage.

The beam splitters 21C and 24C divide a light signal propagated and amplified in the amplifying media 21A and 24A and sends any of the divided ones to the photodetectors 21D and 24D. The photodetectors 21D and 24D detect power of the light divided by the beam splitters 21C and 24C and then outputs an electric signal indicating the detection result to the ALC circuits 21E and 24E. Here, the detection result of the photodetector 24D is also sent to a gain computing circuit 23E as described below.

The ALC circuits 21E and 24E perform feedback control on drive states of the excitation light sources 21B and 24B based on the detection results of the photodetectors 21D and 24D so as to keep power of light signals output from the amplifying media 21A and 24A at a constant level, i.e., a preset target level. With regard to the feedback control of the ALC circuits 21E and 24E on the excitation light sources 21B and 24B, a time constant for each feedback loop is set such that a control speed thereof becomes high enough to compensate for the aforementioned rapid change in power level of received light.

The functional component 22 includes a chromatic dispersion compensator and a polarization-mode dispersion compensator. The functional component receives a light signal amplified with the previous optical amplifying unit 21 and performs chromatic dispersion compensation and polarization-mode dispersion compensation on the light signal. The functional component 22 involves a unique light loss. The light loss varies among the functional components 22 corresponding to the individual channels. In the following description, a variation in light loss between the functional components 22 corresponding to the individual channels is represented by ΔLOSS in some cases.

The variable optical attenuating unit 23 includes a variable optical attenuator (VOA) 23A, a beam splitter 23B, a photodetector (PD) 23C, the beam splitter 24C and photodetector 24D shared with the foregoing subsequent optical amplifying unit 24, and a control unit 23D. The control unit 23D includes the gain computing circuit 23E and an attenuation amount control unit 23F.

The variable optical attenuator 23A attenuates the light signal output from the functional component 22 by a variable optical attenuation amount. The beam splitter 23B divides the light signal attenuated with the variable optical attenuator 23A and sent toward the subsequent optical amplifying unit 24, and then sends any of the divided ones to the photodetector 23C. The photodetector 23C detects power of divided light from the beam splitter 23B and then outputs an electric signal indicating the detection result to the gain computing circuit 23E of the control unit 23D.

The gain computing circuit 23E determines a level of a light signal input/output to/from the subsequent optical amplifying unit 24 based on the detection results of the photodetectors 23C and 24D and then computes a gain of the subsequent optical amplifying unit 24 based on the input/output power to send the computation result to the attenuation amount control unit 23F. The attenuation amount control unit 23F performs feedback control on an optical attenuation amount in the variable optical attenuator 23A such that the gain of the subsequent optical amplifying unit 24 computed with the gain computing circuit 23E is kept constant. With regard to the feedback control of the attenuation amount control unit 23F on the variable optical attenuator 23A, a time constant for feedback loop is set such that a control speed thereof becomes higher than a speed of feedback control of the ALC circuit 24E on the excitation light source 24B. Further, the control unit 23D receives channel information 27 from the outside.

The receiver 25 receives the light signal output from the subsequent optical amplifying unit 24, demodulates the light signal to generate an electric signal, and outputs the signal to the regenerator 26. A target value of an optical input level (corresponding to a target control level of ALC in the subsequent optical amplifying unit 24) is uniquely set for the receiver 25. The target value of the optical input level varies among the receivers 25 corresponding to the individual channels. In the following description, a variation in target value of an optical input level between the receivers 25 corresponding to the individual channels is represented by ΔPin in some cases. The regenerator 26 executes known processing for regenerating received data using an output signal of the receiver 25.

Next, an operation in the first embodiment is described.

In the light receiving unit configured as illustrated in FIG. 1, WDM light propagated through a transmission path undergoes simultaneous amplification in the preamplifier 11 and then undergoes division into the channels CHI to CHn with the separator. Then, the channels are sent to the light receiving modules 13_1 to 13_n, respectively. In each of the light receiving modules 13_1 to 13_n, the light signal from the separator 12 is supplied to the amplifying medium 21A of the previous optical amplifying unit 21. To the amplifying medium 21A, excitation light is input from the excitation light source 21B. The light signal propagating through the amplifying medium 21A is amplified due to a stimulated emission phenomenon of excited rare-earth ions and then output to the functional component 12. At this time, the beam splitter 21C divides the output light from the amplifying medium 21A and sends any of the divided ones to the photodetector 21D. The photodetector 21D detects power of the divided light and sends the detection result to the ALC circuit 21E as well.

The ALC circuit 21E determines a level of power of the light signal output from the amplifying medium 21A and sent toward the functional component 22 through the beam splitter 21C based on the detection result of the photodetector 21D. Then, the circuit performs feedback control on a drive state of the excitation light source 21B such that power of optical output from the previous optical amplifying unit 21 is kept constant at a preset target level even if power of optical input to the previous optical amplifying unit 21 is changed. In the previous optical amplifying unit 21 operated under ALC as above, the total power of generated noise light increases as an output input level thereof reduces and a gain increases. As s result, a light signal including the noise light is input to the functional component 22.

Here, the target control level for the power of optical output from the previous optical amplifying unit 21 is preferably set such that the after-mentioned lower limit of power of optical input to the subsequent optical amplifying unit 24 becomes much higher than the lower limit of power of optical input to the previous optical amplifying unit 21 (for example, 10 dB or more). This is because, if an optical input power is much higher in a previous stage than in a subsequent stage, an amount of noise light generated at the subsequent stage is as small as negligible compared to an amount of noise light generated at the previous stage. Thus, only an attenuation amount of the noise light generated at the previous stage needs to be taken into consideration as an actual generation amount of noise light at the subsequent stage. This facilitates the design for the light receiving module.

The functional component 22 performs chromatic dispersion compensation and polarization-mode dispersion compensation on the output light from the previous optical amplifying unit 21. At this point, since power of the light signal is reduced due to a light loss of each functional component 22 and the light loss varies among components by ΔLOSS, a power level of output light from the functional component 22 varies within a range of ΔLOSS.

FIGS. 3A and 3B are level diagrams of a light signal in the light receiving module. A level diagram in the FIG. 3A is based on the configuration where only the functional component 22 is provided between the previous and subsequent amplifying units 21 and 24, and the variable optical attenuating unit 23 is omitted. A level diagram in the FIG. 3B is based on the configuration where the functional part 22 and the variable optical attenuating unit 23 are provided between the two stages. As illustrated in the FIG. 3A, if only the functional part 22 is provided between the two stages, a light signal having a power in a level range corresponding to the variation ΔLOSS in light loss between the functional components 22 is output from the functional component 22 and input to the subsequent optical amplifying unit 24. In this case, since the subsequent optical amplifying unit 24 operates under ALC, power of output light is kept constant at a target level irrespective of power of optical input to the subsequent optical amplifying unit 24. As a result, a gain of the subsequent optical amplifying unit 24 (corresponding to an inclination of the level diagram) changes, and wavelength characteristics of noise light generated in the subsequent optical amplifying unit 24 change. Here, also in the previous optical amplifying unit 21 operated under ALC, its gain is changed according to an output input power. A generation amount of noise light in the previous optical amplifying unit 21 increases as the optical input power reduces. In FIGS. 3A and 3B, the solid level diagram is based on the worst-case condition where the power of optical input to the previous optical amplifying unit 21 is smallest (lower limit).

The aforementioned change in generation state of noise light in the subsequent optical amplifying unit 24 due to the variation in light loss between the functional components 22 might cause deterioration of reception characteristics of the receiving circuit 25 and the regenerator 26 in the relationship between received light and a wavelength. To that end, in this embodiment, the variable optical attenuator 23A is provided on an optical path between the functional component 22 and the subsequent optical amplifying unit 24 to control an optical attenuation amount thereof to thereby compensate for variations in light loss between the functional components 22 to prevent an actual change in generation state of noise light in the subsequent optical amplifying unit 24. More specifically, an optical attenuation amount of the variable optical attenuator 23A is feedback controlled at a control speed lower than a speed of feedback control performed on the excitation light source 24B by the ALC circuit 24E of the subsequent optical amplifying unit 24 so as to keep a gain of the subsequent optical amplifying unit 24 at a constant level. The feedback control of the variable optical attenuator 23A is carried out using the attenuation amount control unit 23F based on the computation result of the gain computing circuit 23E.

If the gain of the subsequent optical amplifying unit 24 is fixed through the feedback control of the variable optical attenuator 23A, a power level of a light signal indicates a change as indicated by the solid line in the FIG. 3B under the worst-case condition where power of optical input to the previous optical amplifying unit 21 is smallest. Thus, even if a large amount of noise light is generated in the previous optical amplifying unit 21 and amplified in the subsequent optical amplifying unit 24, a wavelength characteristic of the noise light is fixed. As a result, the worst reception wavelength such as minimizes a rate of power of signal light to the total power of noise light is fixed. Accordingly, the deterioration in reception characteristics due to variations in light loss between the functional components 22 can be suppressed.

Consider that the variation in light loss between the functional components 22 is 5 db, for example. If the variation is compensated for by the variable optical attenuation unit 23 and a change in gain of the subsequent optical amplifying unit 24 is suppressed by 5 dB, an increase in the total power of noise light is about 0.4 dB under the condition that the gain of the subsequent optical amplifying unit 24 is changed by 1 dB in a wavelength band of 1530 to 1563 nm. Thus, it is expected that a rate of lower of signal light to the total power of noise light in light input to the receiver 25 be increased by about 2 dB.

Figure 14:
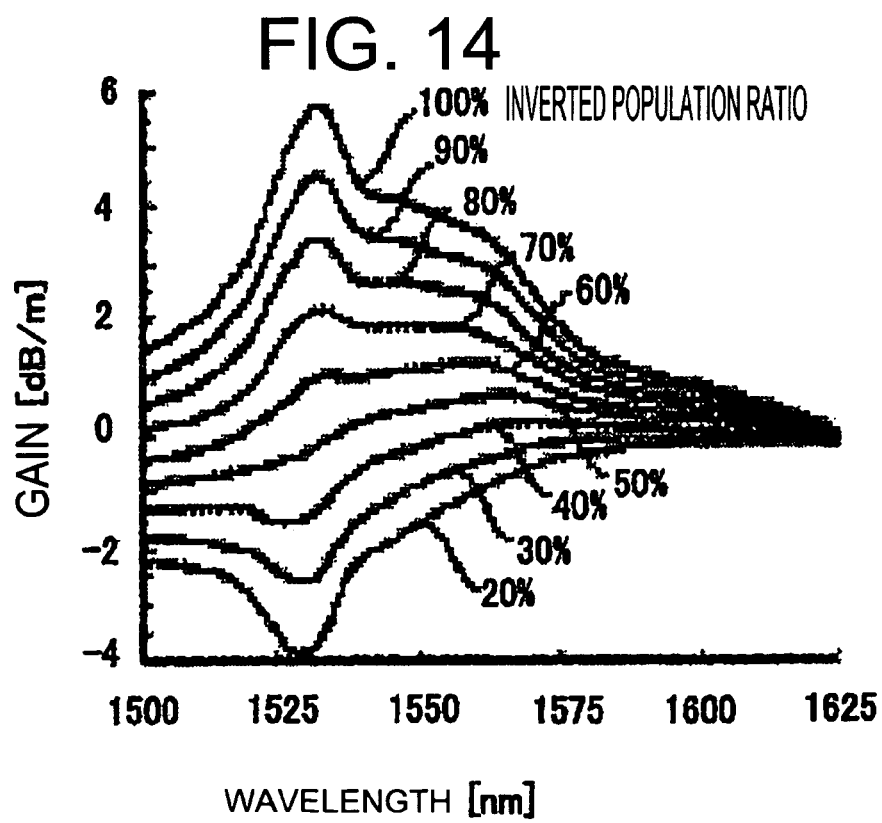
FIG. 14 illustrates a gain spectrum of EDFA.

As for the target control value (target value of a gain of the subsequent optical amplifying unit 24) in the attenuation amount control unit 23F of the variable optical attenuation unit 23, a gain is set to realize desired BER in all of the light receiving modules 13_1 to 13_n corresponding to each channel of WDM light under the worse-case condition. A target control value of AGC may be set uniformly regardless of reception wavelength or set for each reception wavelength. To give a specific example thereof, considering that channels CH1 to CH40 are arranged in the order from the short-wavelength side using WDM light having wavelengths in the C band, and an Erbium-doped fiber (EDF) is applied to the amplifying media 21B and 24B of the previous and subsequent amplifying units, a rate of power of signal light to the total power of noise light that influences BER (optical SN ratio) is as illustrated in FIGS. 4A and 4B. In this example, in the case of uniformly setting a target control value of AGC regardless of a reception wavelength, as illustrated in the FIG. 4A, it is desirable to set, as the control target value of AGC, a gain G such as would produce the highest optical SN ratio for all of the channels CH1 to CH40. The lowest SN of the optical SN ratios obtained at the gain G is higher than the worst value SN' of the optical SN ratios obtained when AGC is not applied by an amount corresponding to the arrow in FIG. 14 (corresponding to an increase of about 2 db in the above numerical example).

In addition, in the case of setting a target control value for each reception wavelength, it is preferable to set, as the target control value of AGC, a relatively large gain $G_{CH1}$ for the channel CH1 on the short-wavelength side and a relatively small gain $G_{CH40}$ for the channel CH40 on the long-wavelength side (similar to the gain G in the FIG. 4A) using channel information 27 supplied to the control unit 23D as illustrated in the FIG. 4B. As compared to the case of uniformly setting the target control value of AGC, an optical SN ratio $SN_{CH1}$ obtained at the gain $G_s$ in the channel CH1 becomes higher than an optical SN ratio $SN_{CH1'}$ obtained at a gain $G_L$ by an amount corresponding to the arrow in FIGS. 4A and 4B.

According to the light receiving module of this embodiment, since the variable optical attenuator 23A is provided on the optical path between the functional component 22 and the subsequent optical amplifying unit 24, an optical attenuation amount of the variable optical attenuator 23A is feedback-controlled to keep a gain of the variable optical attenuator 23A operated under ALC at a constant level to compensate for variations in light loss between functional components 22, deterioration of reception characteristics due to noise light generated in the previous and subsequent amplifying units 21 and 24 can be suppressed. Further, since high-speed ALC is applied to the previous and subsequent amplifying units 21 and 24, occurrences of transmission errors due to a rapid change in power level of received light can be prevented. Accordingly, it becomes easy to uniformly design single-waveform optical amplifiers disposed at previous and subsequent stages to the receiver 25 in the light receiving modules 13_1 to 13_n corresponding to each channel of WDM light, and it becomes possible to realize a light receiving module capable of surely receiving a light signal that propagates at as high a speed as 40 Gb/s or more, at a low cost.

Figure 5:
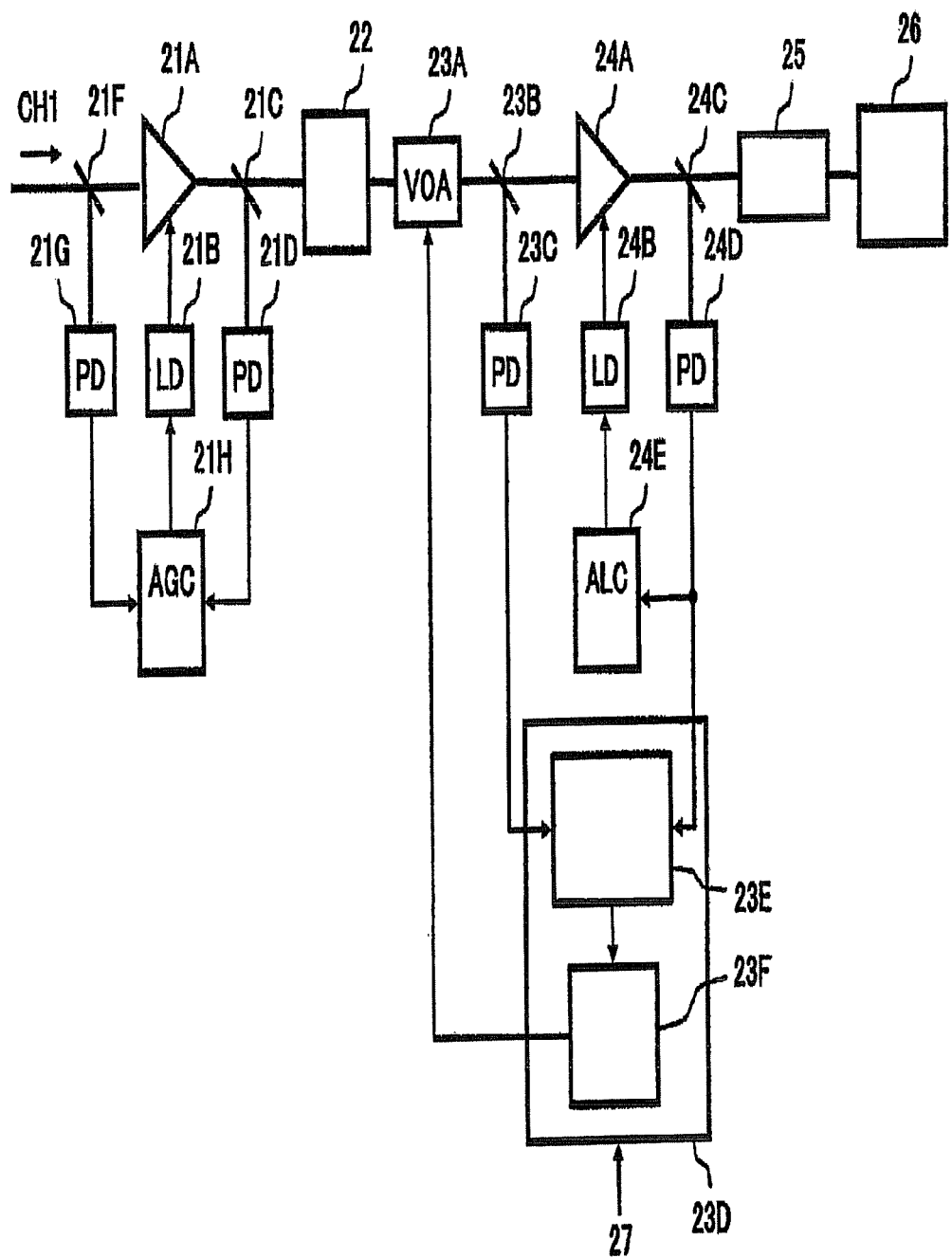
FIG. 5 is a block diagram of configuration example of the light receiving module in the case where AGC is applied to a previous optical amplifying unit in the first embodiment.

The above first embodiment describes an example where the ALC is applied to both of the previous and subsequent amplifying units 21 and 24. However, the AGC may be applied to the previous optical amplifying unit 21. FIG. 5 illustrates a configuration example of the light receiving module 13_1 in this case. In the configuration example, a beam splitter 21F and a photodetector 21G are added to monitor power of optical input to the previous optical amplifying unit 21, and the detection results of the photodetectors 21D and 21D are sent to the AGC circuit 21H. In the AGC circuit 21H, a gain is computed based on the detection results of the photodetectors 21D and 21D, and the excitation light source 21B is feedback-controlled to keep the gain constant at a predetermined target value.

Figure 6:
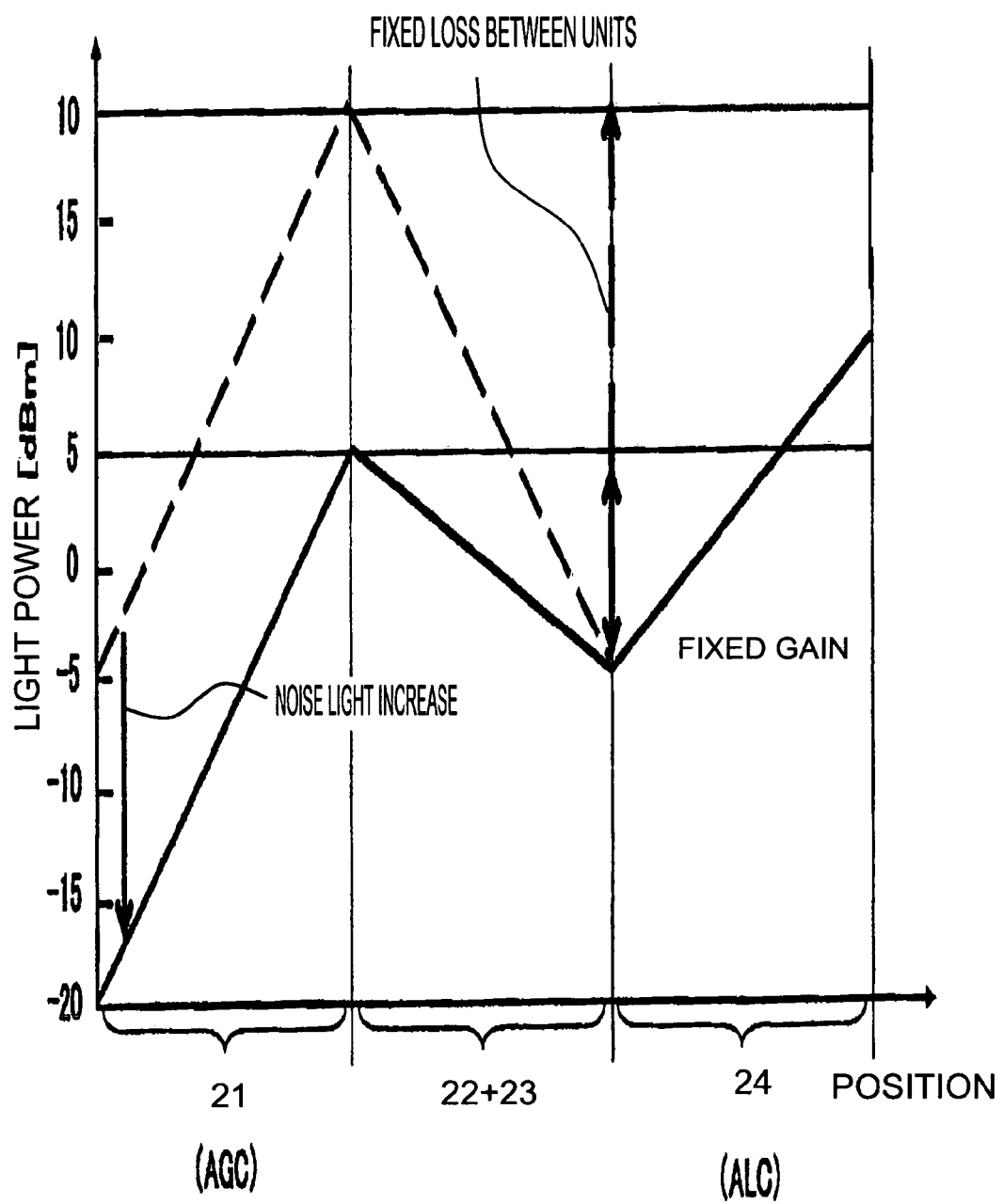
FIG. 6 illustrates an example of a level diagram of a light signal in the configuration example in FIG. 5.

FIG. 6 illustrates an example of a level diagram in the case where the AGC is applied to the previous optical amplifying unit 21. By compensating for variations in both of a dynamic range of optical input to the previous optical amplifying unit 21 and a light loss between the functional components 22 using the variable optical attenuation unit 23 as above, a generation state of noise light in the subsequent optical amplifying unit 24 is not substantially changed and reception characteristics are improved similarly to the first embodiment.

Next, a light receiving module according to a second embodiment of the present invention is described.

Figure 7:
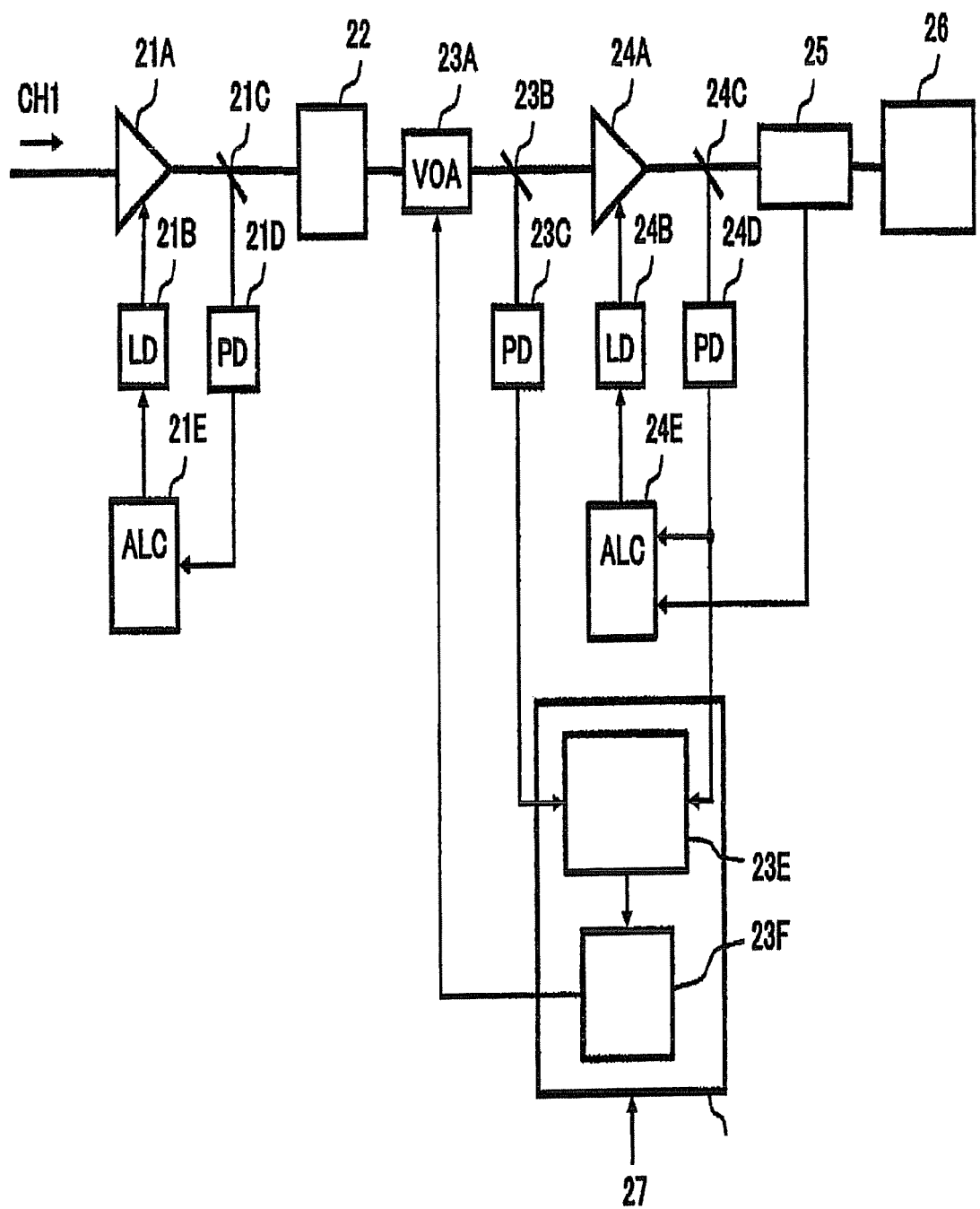
FIG. 7 is a block diagram of the configuration of a light receiving module according to a second embodiment of the present invention.

FIG. 7 is a block diagram of the configuration of the light receiving device of the second embodiment.

In FIG. 7, the configuration of the light receiving module 13_1 of this embodiment differs from the configuration of the first embodiment illustrated in FIG. 2 in that the receiver 25 has a function for notifying any external unit of information about a target value of an optical input level, and target value information regarding an optical input level of the receiver 25 is supplied to the ALC circuit 24E of the subsequent optical amplifying unit 24.

The performance varies among the receivers 25 disposed in each of the light receiving modules 13_1 to 13_n. A target value of a level of light input to each receiver 25 varies depending on the performance. Therefore, it is desirable to set a target control value of ALC in the subsequent optical amplifying unit 24 in accordance with a target value of a level of light input to the receiver 25 actually connected to the output of the subsequent optical amplifying unit 24. To that end, in this embodiment, the receiver 25 notifies the ALC circuit 24E of the subsequent optical amplifying unit 24 about a target value of a level of light input thereto. Then, in the ALC circuit 24E, a target control level of ALC is automatically set in accordance with the information notified by the receiver 25. Thus, as in the first embodiment, in the subsequent optical amplifying unit 24, the excitation light source 24B is feedback-controlled to keep an optical output power constant at the target control level after the optical amplification. Further, the variable optical attenuation unit 23 compensates for variations in light loss between the functional components 22 to keep the gain of the subsequent optical amplifying unit 24 constant.

Figure 8A:
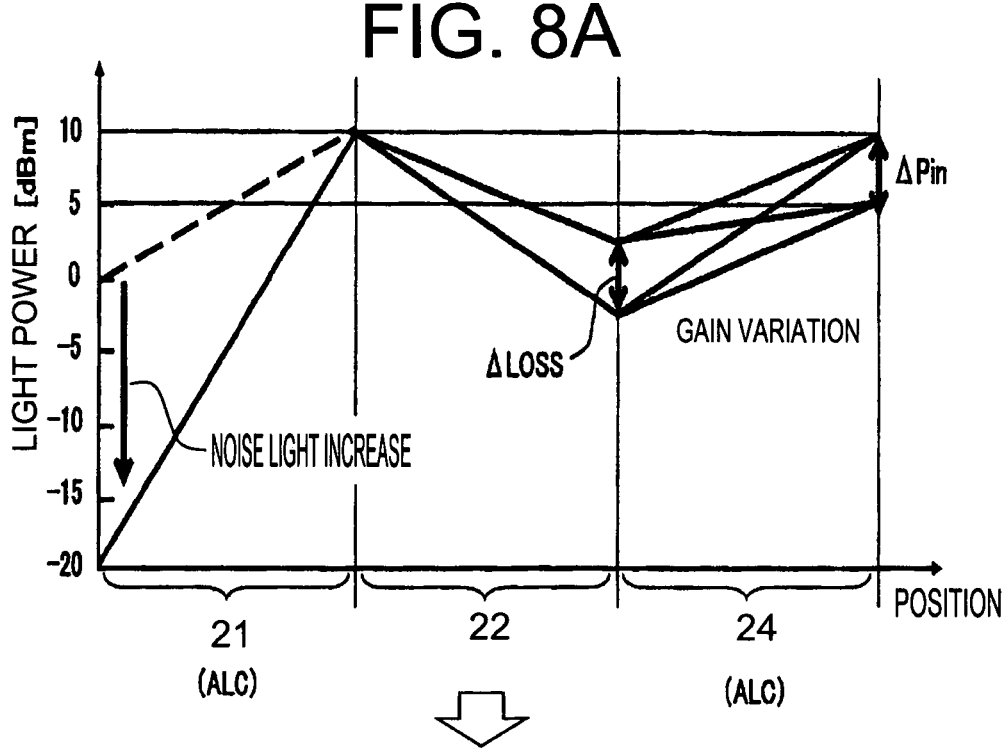
FIGS. 8A and 8B illustrate examples of a level diagram of a light signal in the light receiving module of the second embodiment.
Figure 8B:
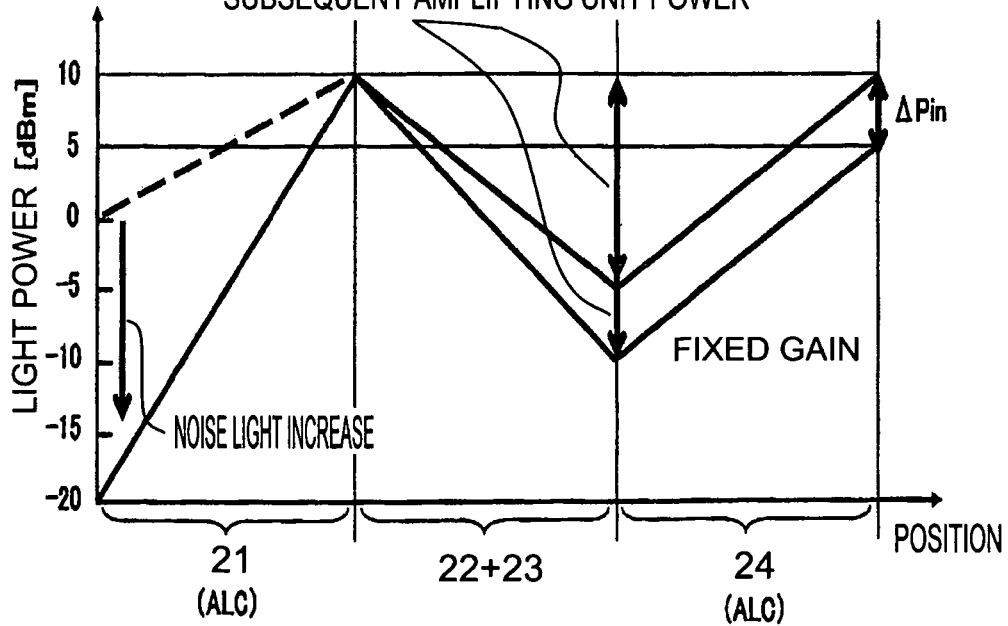

FIGS. 8A and 8B are level diagrams of a light signal in the light receiving module similar to FIGS. 3A and 3B. In the level diagram of FIGS. 8A and 8B, a light signal output from the subsequent optical amplifying unit 24 has a power in a level range corresponding to the variation ΔPin in target value of an optical input level among the receivers 24. Considering the configuration where only the functional component 22 is provided between the stages of the optical amplifying units 21 and 24 as illustrated in the FIG. 8A, a gain of the subsequent optical amplifying unit 24 (corresponding to an inclination of the level diagram) is changed according to a combination of the variation ΔLOSS in light loss between the functional components 22 and the variation ΔPin in target value of an optical input level among the receivers 24. This changes wavelength characteristics of noise light generated in the subsequent optical amplifying unit 24. On the other hand, considering the configuration where the functional component 22 and the variable optical attenuation unit 23 are provided between the stages of the optical amplifying units 21 and 24 as illustrated in the FIG. 8B, the variation ΔLOSS in light loss between the functional components 22 is compensated for by the variable optical attenuation unit 23, and a loss between the stages of the optical amplifying units 21 and 24 changes depending on the value set for a power of optical output from the subsequent optical amplifying unit 24. Thus, the gain of the subsequent optical amplifying unit 24 can be kept constant.

According to the light receiving module of the second embodiment, in addition to the same advantages as the first embodiment, even if a target value of a level of an optical input level in the receiver 25 varies largely, the target control level of ALC in the subsequent optical amplifying unit 24 can be automatically set in accordance with a target value of an optical input level of the receiver 25 actually connected to the subsequent optical amplifying unit 24. Thus, it becomes easier to uniformly design single-waveform optical amplifiers disposed at previous and subsequent stages to each receiver 25 in the light receiving modules 13_1 to 13_n corresponding to each cannel of WDM light.

Figure 9:
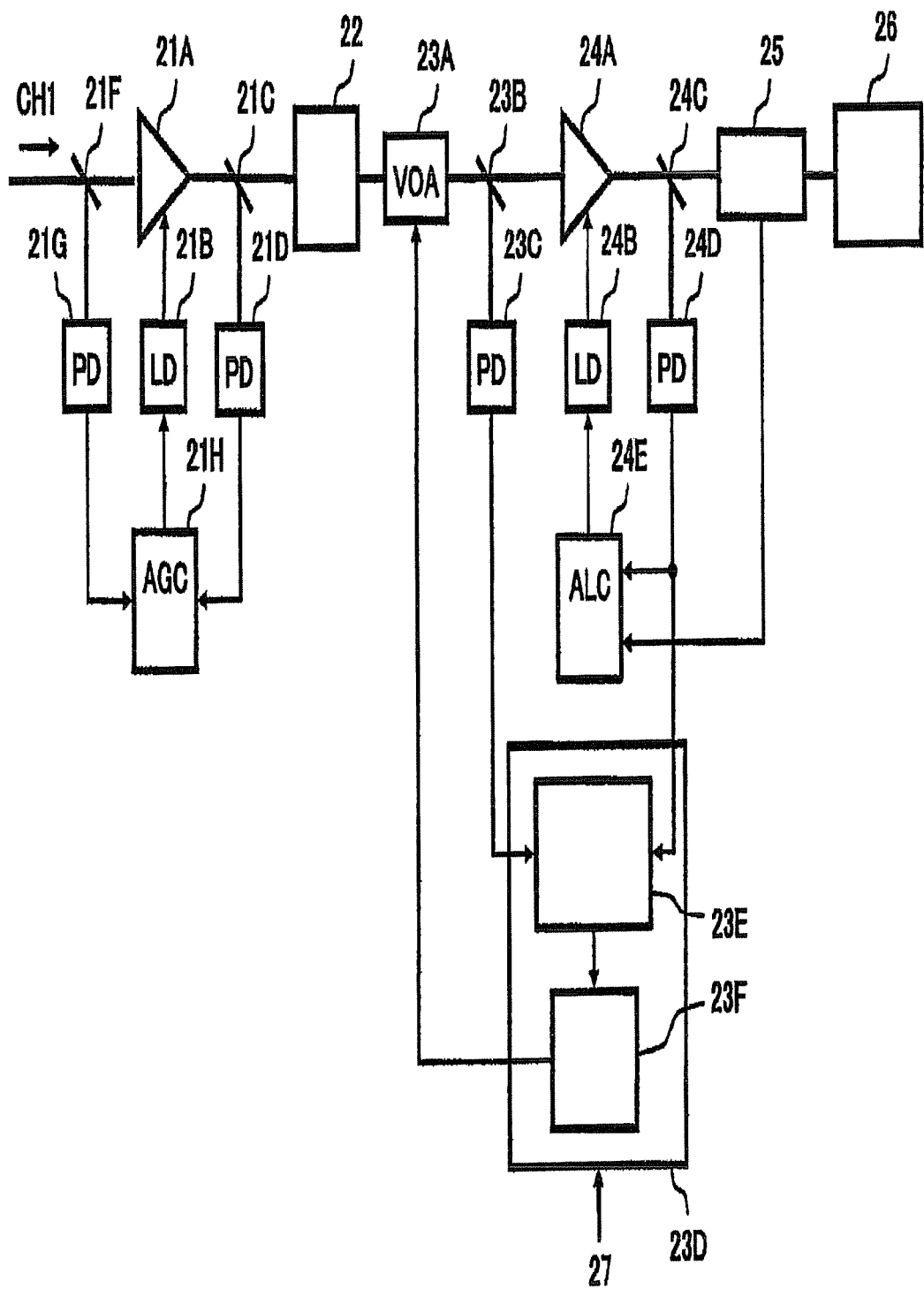
FIG. 9 is a block diagram of a configuration example of the light receiving module in the case where AGC is applied to a previous optical amplifying unit in the second embodiment.
Figure 10:
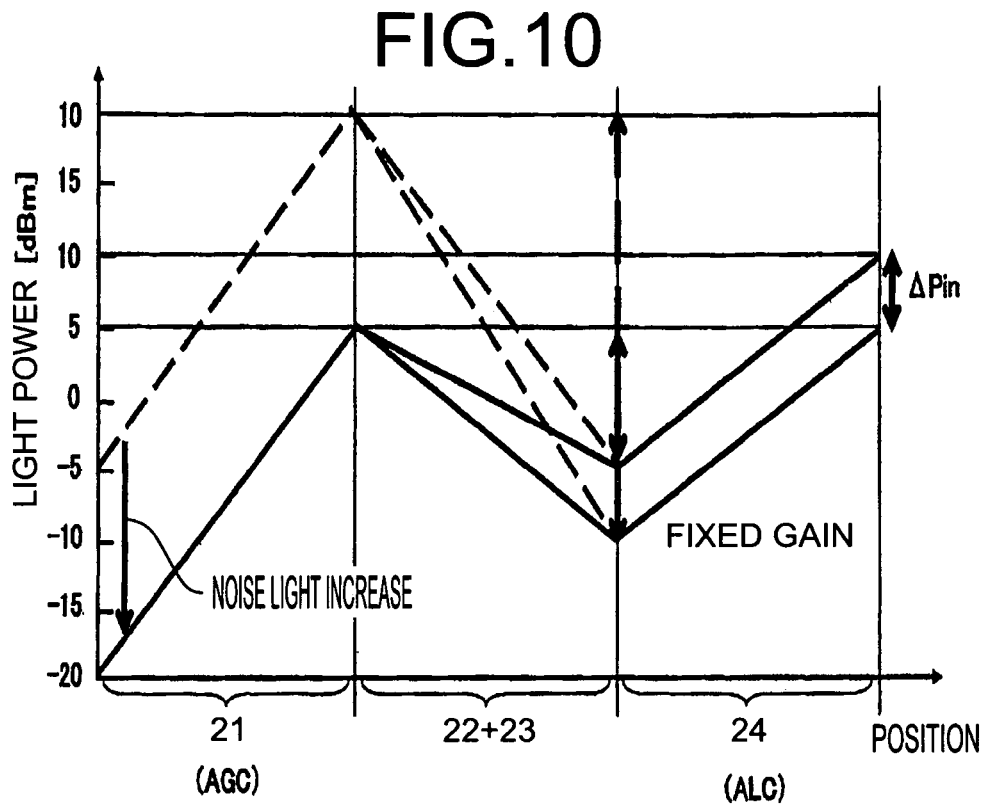
FIG. 10 illustrates an example of a level diagram of a light signal in the configuration example in FIG. 9.
Figure 11:
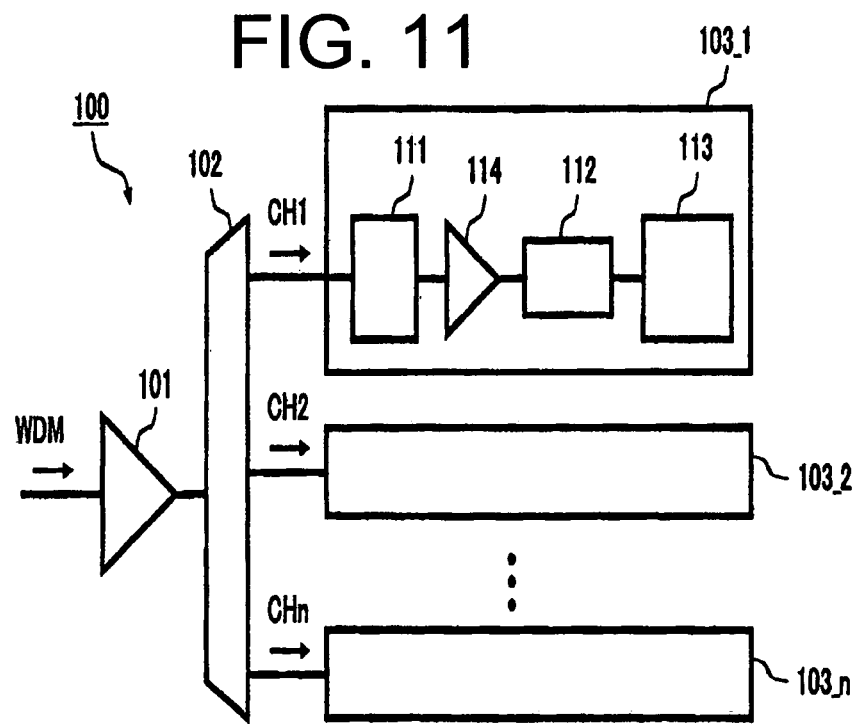
FIG. 11 is a block diagram of a configuration example of a light receiving unit of a conventional WDM transmission system.
Figure 13:
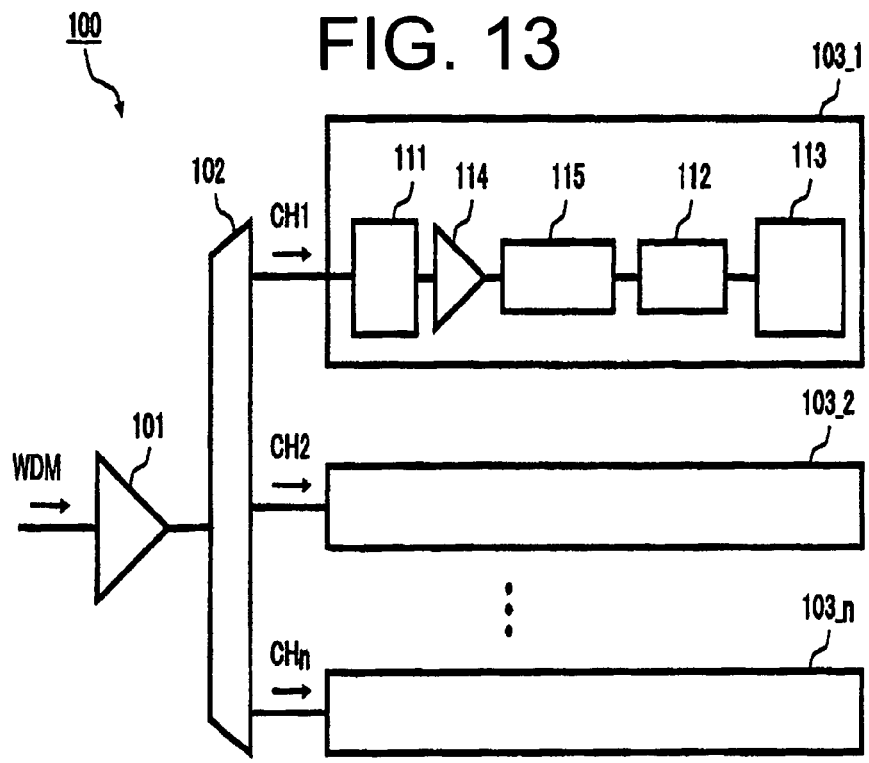
FIG. 13 illustrates a conventional configuration example where noise light generated in a single-wavelength optical amplifier is filtered out by an optical filter.

Also in the second embodiment, the AGC is applicable to the previous optical amplifying unit 21 in the same manner as in FIGS. 5 and 6. FIGS. 9 and 10 illustrate a configuration example of the light receiving module and its level diagram in this case. In the case of applying the AGC to the previous optical amplifying unit 21, a loss between the stages of the amplifying units 21 and 24 is changed according to a dynamic range of optical input to the previous optical amplifying unit 21 and a value set for power of optical output from the subsequent optical amplifying unit 24.

Further, the beam splitter 21C of the previous optical amplifying unit 21 and the photodetector 21D of the first and second embodiments can be omitted by sharing the beam splitter 23B and the photodetector 23B of the variable optical attenuation unit 23. In this case, a detection result of the photodetector 23B is sent to the ACL circuit 21E as well as the gain computing circuit 23E. This enables size reduction of the light receiving module. Moreover, as for the amplifying media 21A and 24A of the previous and subsequent amplifying units, a not-illustrated temperature adjusting device may be provided for keeping their temperatures at a constant level. By disposing the temperature adjusting device, gain wavelength characteristics can be prevented from changing due to a temperature change in the amplifying media 21A and 24A, and reception characteristics are further improved.

According to the above optical amplifier and light receiving module, since the functional component and the variable optical attenuation means are disposed on the optical path between the previous optical amplification means and the subsequent optical amplification means to control an optical attenuation amount in the variable optical attenuation means based on a gain of the subsequent optical amplification means subjected to automatic level control, variations in light loss among the functional components are compensated for, and a generation status of noise light is not changed substantially at the previous optical amplification means and the subsequent optical amplification means. Hence, deterioration of reception characteristics can be suppressed. Further, since the automatic level control is applied to the subsequent optical amplification means, occurrences of transmission errors accompanying a rapid change in power level of received light can be also prevented. Accordingly, it becomes easy to uniformly design single-waveform optical amplifiers disposed at a previous stage to a receiver in a light receiving module ready for each channel of WDM light, and it becomes possible to realize a light receiving module capable of surely receiving a light signal that propagates at as high a speed as 40 Gb/s or more, at a low cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical amplifying device comprising:
   a first optical amplifier for amplifying signal light of a single wavelength;
   a second optical amplifier serially connected with the first optical amplifier;
   an optical device for compensating deterioration of the signal light, the optical device arranged between the first optical amplifier and the second optical amplifier;
   a variable optical attenuator for attenuating the signal light, the variable optical attenuator arranged between the first optical amplifier and the second optical amplifier;
   a first automatic level controller for detecting a second amplifier output power and for controlling driving status of the second amplifier to be a predetermined output power level in accordance with the detected second amplifier output power; and
   a first automatic gain controller for detecting an input power of the second optical amplifier and an output power of the second optical amplifier, and for controlling an optical attenuation value of the variable optical attenuator in accordance with the detected input power and output power of the second amplifier.

2. The optical amplifying device of claim 1, wherein the controlling the optical attenuation value of the variable optical attenuator is slower than the controlling driving status of the second amplifier.

3. The optical amplifying device of claim 1, further comprising a second automatic level controller for detecting a first amplifier output power and for controlling driving status of the first optical amplifier to be a predetermined output power level in accordance with the detected first amplifier output power.

4. The optical amplifying device of claim 1, further comprising a second automatic gain controller for detecting a first amplifier gain and for controlling driving status of the first amplifier to be a predetermined gain level in accordance with the detected first amplifier gain.

5. The optical amplifying device of claim 1, wherein the second optical amplifier has a bottom value of input power of light, the bottom value of input power of light being 10 dB larger than the value of input power of light of the first optical amplifier.

6. The optical amplifying device of claim 1, wherein the optical device is a chromatic dispersion compensator.

7. The optical amplifying device of claim 1, wherein the optical device is a polarization mode dispersion compensator.

8. The optical amplifying device of claim 1,
   wherein the first automatic level controller includes:
      a first beam splitter for splitting an output light from the second optical amplifier,
      a first detector for detecting power of an split light from the first beam splitter, and
      an automatic level controller circuit for controlling driving status of the second optical amplifier to be constant the detected power of the first detector in a predetermined output level, and
   wherein the first automatic gain controller includes:
      a second beam splitter for splitting power of the input light to the second optical amplifier,
      a second detector for detecting power of the split light from the second beam splitter,
      a gain calculator circuit for calculating gain of the second optical amplifier by the use of the outputs of the first detector and the second detector, and
      an attenuation value controller controlling an optical attenuation value of the variable optical attenuator to be constant the calculated gain of the gain calculator circuit in a predetermined value.

9. The optical amplifying device of claim 1, wherein the first automatic gain controller is set a target control value in accordance with a wavelength of the optical signal.

10. The optical amplifying device of claim 1, wherein the first optical amplifier and the second optical amplifier includes a rare earth doped optical fiber and a pump light source for pumping the rare earth doped optical fiber.

11. The optical amplifying device of claim 1, further comprising a temperature controller for controlling temperature of the first optical amplifier and the second optical amplifier to keep the temperature constant.

12. An apparatus comprising:
   an optical amplifying device including:
      a first optical amplifier for amplifying signal light inputted from an optical transmission line,
      a second optical amplifier serially connected with the first optical amplifier,
      an optical device for compensating deterioration of the signal light, the optical device arranged between the first optical amplifier and the second optical amplifier,
      a variable optical attenuator for attenuating the signal light, the variable optical attenuator arranged between the first optical amplifier and the second optical amplifier,
      a first automatic level controller for detecting a second amplifier output power and for controlling driving status of the second amplifier to be a predetermined output power level in accordance with the detected second amplifier output power, and
      a first automatic gain controller for detecting an input power of the second optical amplifier and an output power of the second optical amplifier, and for controlling an optical attenuation value of the variable optical attenuator in accordance with the detected input and output power of the second optical amplifier;
   a receiver for receiving the output of the optical amplifying device and demodulating the optical signal into an electrical signal; and
   a regenerating circuit for regenerating by the use of an output data of the receiver.

13. The apparatus of claim 12, wherein the receive for informing information of a target control value of the second optical amplifier to the first automatic level controller, and wherein the first automatic gain controller is set the target control value in accordance with a wavelength of the optical signal.

14. The optical amplifying device of claim 1, wherein the signal light of the single wavelength is a signal light that has been demultiplexed from a wavelength division multiplexed light.

* * * * *